United States Patent
Husth

(10) Patent No.: US 9,191,905 B2
(45) Date of Patent: Nov. 17, 2015

(54) METHOD, APPARATUS AND COMPUTER READABLE MEDIUM FOR SETTING A RADIO FREQUENCY GAIN

(75) Inventor: Arne Birger Husth, Hellerup (DK)

(73) Assignee: BROADCOM CORPORATION, Irvine, CA (US)

( * ) Notice: Subject to any disclaimer, the term of this patent is extended or adjusted under 35 U.S.C. 154(b) by 42 days.

(21) Appl. No.: 13/166,429

(22) Filed: Jun. 22, 2011

(65) Prior Publication Data

US 2012/0327820 A1 Dec. 27, 2012

(51) Int. Cl.
*H04J 3/06* (2006.01)
*H04W 56/00* (2009.01)

(52) U.S. Cl.
CPC ...................................... *H04W 56/00* (2013.01)

(58) Field of Classification Search
USPC ......... 370/202, 229, 230, 236, 252, 254, 310, 370/318, 328, 350
See application file for complete search history.

(56) References Cited

U.S. PATENT DOCUMENTS

| | | | | |
|---|---|---|---|---|
| 8,244,195 | B2 * | 8/2012 | Wilson ....................... | 455/253.2 |
| 8,536,949 | B1 * | 9/2013 | Perlow et al. ................. | 330/284 |
| 2002/0118779 | A1 * | 8/2002 | Wu et al. ...................... | 375/345 |
| 2003/0091132 | A1 * | 5/2003 | Anderson ..................... | 375/345 |
| 2004/0033790 | A1 * | 2/2004 | Thurston et al. .............. | 455/136 |
| 2007/0003078 | A1 * | 1/2007 | Escott et al. .................. | 381/107 |
| 2008/0273636 | A1 * | 11/2008 | Zhu et al. ...................... | 375/345 |
| 2010/0248665 | A1 * | 9/2010 | Jonsson et al. ................ | 455/140 |
| 2010/0277235 | A1 * | 11/2010 | Dauphinee et al. ........... | 330/129 |
| 2010/0322117 | A1 * | 12/2010 | Gurski et al. ................. | 370/280 |
| 2011/0038336 | A1 * | 2/2011 | Mo ................................ | 370/329 |
| 2011/0069786 | A1 * | 3/2011 | Sahara .......................... | 375/316 |
| 2011/0080219 | A1 * | 4/2011 | Young et al. .................. | 330/279 |
| 2011/0111716 | A1 * | 5/2011 | Watanabe .................. | 455/232.1 |
| 2011/0243038 | A1 * | 10/2011 | Challa et al. .................. | 370/280 |
| 2011/0250911 | A1 * | 10/2011 | Xu et al. ....................... | 455/501 |
| 2011/0263265 | A1 * | 10/2011 | Caretti et al. ................. | 455/450 |
| 2012/0140644 | A1 * | 6/2012 | Ngai et al. .................... | 370/252 |
| 2012/0274398 | A1 * | 11/2012 | Alavi et al. ................... | 330/1 R |
| 2014/0018027 | A1 * | 1/2014 | Wilhelmsson et al. .... | 455/234.1 |

FOREIGN PATENT DOCUMENTS

| | | |
|---|---|---|
| JP | 2003-124909 A | 4/2003 |
| KR | 2009-0022385 A | 3/2009 |
| WO | WO 2006/059829 A2 | 6/2006 |

OTHER PUBLICATIONS

Jun-Hee Jang, et al.; "A Fast Automatic Gain Control Scheme for Initial Cell Search in 3GPP LTE TDD System"; 13th International Conference on Advanced Communication Technology (ICACT); Published Feb. 2011; pp. 833-838.

(Continued)

*Primary Examiner* — Kwang B Yao
*Assistant Examiner* — Nguyen Ngo
(74) *Attorney, Agent, or Firm* — Oblon, McClelland, Maier & Neustadt, L.L.P.

(57) ABSTRACT

The invention teaches a solution for a Time Division Duplex (TDD) and Frequency Division Duplex (FDD) networks. In the solution, a threshold value is set for a radio frequency gain. The value of the radio frequency gain is limited to the threshold value during an initial synchronization phase where user equipment is first trying to receive synchronization signals in a transmission from a base station.

20 Claims, 4 Drawing Sheets

---

SETTING A THRESHOLD VALUE FOR A RF GAIN — 200

↓

ADJUSTING THE RADIO FREQUENCY GAIN DURING AN INITIAL SYNCHRONIZATION PHASE TO THE THRESHOLD VALUE WHEREIN THE RADIO FREQUENCY GAIN IS LIMITED BY THE THRESHOLD VALUE — 202

(56) References Cited

OTHER PUBLICATIONS

Combined Search and Examination Report for GB Application No. 1110566.5, dated Oct. 14, 2011 (6 pgs.).
Examination Report for GB Application No. 1110566.5, dated Feb. 3, 2012 (3 pgs.).
Examination Report for GB Application No. 1110566.5, dated Jun. 1, 2012 (3 pgs.).
Notification of Allowance for GB Application No. 1110566.5, dated Oct. 11, 2012 (1 pg.).
Office Action for U.S. Appl. No. 13/672,305; dated Apr. 26, 2013.

* cited by examiner

METHOD, APPARATUS AND COMPUTER READABLE MEDIUM FOR SETTING A RADIO FREQUENCY GAIN

FIELD OF THE INVENTION

The invention relates to wireless communications. More specifically, the invention relates to a method, an apparatus and a computer readable medium comprising a computer program for reducing the impact of interference experienced by user equipment e.g. in a Long Term Evolution (LTE) Time Division Duplex (TDD) or Frequency Division Duplex (FDD) network.

BACKGROUND OF THE INVENTION

In a Time Division Duplex (TDD) network, uplink (UL) and downlink (DL) transmissions are done in the same frequency channel, and uplink and downlink transmissions are separated in time. When user equipment (UE) is synchronized to a cell in a TDD network, it will only open its downlink receiver for reception in the time periods allocated for downlink transmissions. In the initial synchronization phase where the user equipment is first trying to receive synchronization signals in a cell, the user equipment is not yet aware of the frame synchronization in the cell. In this synchronization phase, the user equipment needs to search continuously on the channel frequency for some time in order to find the synchronization channels.

In Long Term Evolution (LTE) TDD networks, synchronization channels are transmitted from the base station (eNodeB) with an interval of 5 ms. The minimum time required for the search is therefore 5 ms plus the length of the synchronization symbol. During this search time, the user equipment receiver will capture all signals transmitted on the channel frequency.

A problem may exist for the user equipment if there is another user equipment nearby which is already synchronized to the same cell (or in the same network) and is allocated uplink transmissions while the first user equipment is capturing its search signal. FIG. 1A illustrates this situation. An interfering signal as seen from the first user equipment 100 can be extremely high if the second user equipment 102 is close to the first user equipment 100. One particularly difficult situation occurs when the downlink signal from a base station 104 is weak and the second user equipment 102 is close to the first user equipment 102.

If the downlink signals are close to or below a reference sensitivity level and the second user equipment 102 is within a few meters of the first user equipment 100, then the signal level difference between the desired signal and the interfering signal can be around 100 dBs. Although the desired and the interfering signals are separated in time, this scenario represents a problem to the receiver's Automatic Gain Control (AGC).

In another difficult situation, there is only a very short time between the uplink region and the synchronization channels in the radio time frame. The AGC has to settle to a usable radio frequency (RF) gain before the synchronization channel is received. During the uplink region, the AGC might have been seriously misadjusted, i.e. the radio frequency gain might be set very low to adapt to the strong UL signal. During the transition region from uplink to the start of synchronization channels, the AGC has to iterate towards a radio frequency gain setting suitable for receiving the small downlink signal.

In this transition region, there is a further risk that there are only Common Reference Signals (CRS) transmitted from the eNodeB. This will be the situation if there are no download allocations to any user equipment during this period. As CRS symbols are transmitted with a separation in time of three or four symbols, this issue puts a further requirement on the length of the signal power measurement that is done by the AGC to estimate the signal level.

Because of the minimum power measurement length for each AGC iteration, there is a limitation on the number of iterations that it is possible to do in the transition region. The AGC is normally only able to step the gain up (or down) by a certain number of decibels for each iteration. The step size depends on for example an assessment of the received signal level using the current gain setting.

Another problem to the AGC occurs when there are no uplink allocations in the TDD uplink region and the user equipment that needs to synchronize to the LTE cell is very close to an eNodeB. FIG. 1B illustrates this situation. In this situation, the user equipment 106 could be receiving a very weak signal in the uplink region of the time frame. In theory, the received signal level can be as low as the thermal noise floor. Because the user equipment 106 is very close to the eNodeB 108, the synchronization channel might be received as a very strong signal, for example −25 dBm. In this scenario, the AGC of the user equipment will face the challenge of settling to an appropriate low RF gain level for reception of the SCH channel shortly after having settled to a very high RF gain level in the uplink region.

A similar problem (i.e. settling to a usable radio frequency gain) exists in LTE Frequency Division Duplex (FDD) networks. For example, in a MBMS Single Frequency Network (MBSFN), the data load can be varying in MBSFN regions of the downlink signal. All symbols in a subframe but the first (which contains a CRS pilot) can be empty. For example, if the wanted downlink signal is very strong (e.g. −25 dBm) and the gain control has settled to a very high value because there is no signal received in the MBSFN region, then the gain will have to change from the very high value to a very low value during only a few AGC iterations.

Based on the above, there is a need for a solution that would solve or at least mitigate the above problems or drawbacks.

SUMMARY OF THE INVENTION

According to a first aspect of the invention, there is provided a method comprising:
 setting a threshold value for a radio frequency gain; and
 adjusting the radio frequency gain during an initial synchronization phase where user equipment is first trying to receive synchronization signals in a transmission from a base station wherein the radio frequency gain is limited by the threshold value.

According to a second aspect of the invention, there is provided an apparatus comprising:
 at least one processor configured to cause the apparatus to:
 set a threshold value for a radio frequency gain; and
 adjust the radio frequency gain during an initial synchronization phase where user equipment is first trying to receive synchronization signals in a transmission from a base station such that the radio frequency gain is limited by the threshold value.

According to a third aspect of the invention, there is provided a computer-readable medium comprising a computer program bearing computer program code for use with a computer, the computer program code comprising:
 code for setting a threshold value for a radio frequency gain; and code for adjusting the radio frequency gain during an initial synchronization phase where user equipment is first trying to receive synchronization signals in a transmission from a base station wherein the radio frequency gain is limited by the threshold value.

According to a fourth aspect of the invention, there is provided an apparatus comprising means for setting a threshold value for a radio frequency gain and means for adjusting the radio frequency gain during an initial synchronization phase where user equipment is first trying to receive synchronization signals in a transmission from a base station wherein the radio frequency gain is limited by the threshold value.

According to a fifth aspect of the invention, there is provided a receiver configured to set a threshold value for a radio frequency gain and adjust the value of the radio frequency gain during an initial synchronization phase where user equipment is first trying to receive synchronization signals in a transmission from a base station such that the radio frequency gain is limited by the threshold value.

According to a sixth aspect of the invention, there is provided a receiver comprising means for setting a threshold value for a radio frequency gain and means for adjusting the radio frequency gain during an initial synchronization phase where user equipment is first trying to receive synchronization signals in a transmission from a base station wherein the radio frequency gain is limited by the threshold value.

According to a seventh aspect of the invention, there is provided a computer program bearing computer program code for use with a computer, the computer program code comprising code for setting a threshold value for a radio frequency gain and computer code for adjusting the radio frequency gain during an initial synchronization phase where user equipment is first trying to receive synchronization signals in a transmission from a base station wherein the radio frequency gain is limited by the threshold value.

In one embodiment, setting the threshold value comprises setting a lower threshold value for the radio frequency gain.

In one embodiment, setting the threshold value comprises setting an upper threshold value for the radio frequency gain.

In one embodiment, setting the threshold value comprises setting an upper threshold value and a lower threshold value, wherein the radio frequency gain is allowed to alternate between the upper and lower threshold values.

In one embodiment, the upper threshold value is set to a gain value where the maximum level of a synchronization signal can be detected without significant degradation in detection performance.

In one embodiment, the lower threshold value is set to a gain value where the minimum level of a synchronization signal can be detected without significant degradation in detection performance.

In one embodiment, the transmission is a Long Term Evolution time division duplex transmission.

In one embodiment, the transmission is a Long Term Evolution frequency division duplex transmission.

Advantages relating to at least some embodiments of the invention include improving the likelihood of successful synchronization attempt in a cell of a TDD or FDD network.

BRIEF DESCRIPTION OF THE DRAWINGS

Embodiments of the present invention will now be described by way of example with reference to the accompanying drawings, in which.

DETAILED DESCRIPTION OF THE INVENTION

Reference will now be made in detail to the embodiments of the present invention, examples of which are illustrated in the accompanying drawings.

Figure 1A:
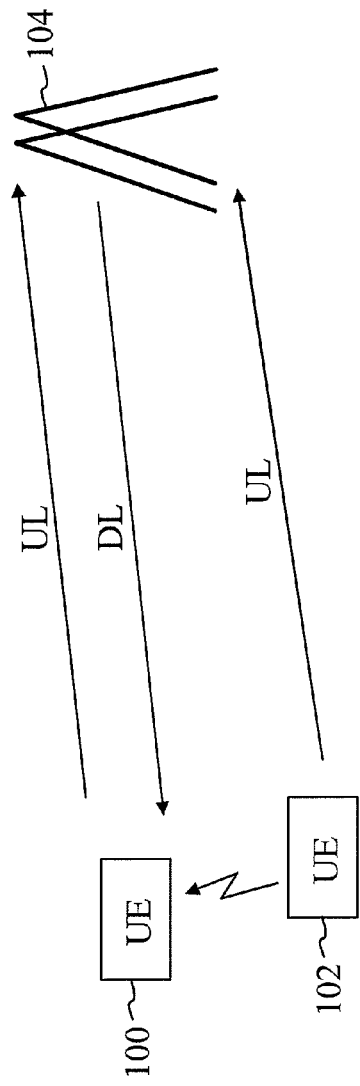
FIG. 1A shows a situation where first user equipment is interfered by second user equipment.
Figure 1B:
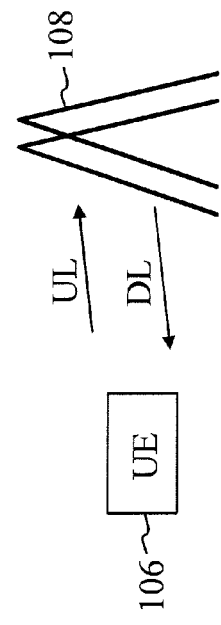
FIG. 1B shows a situation where user equipment sets a high radio frequency gain in the uplink region.
Figure 2:
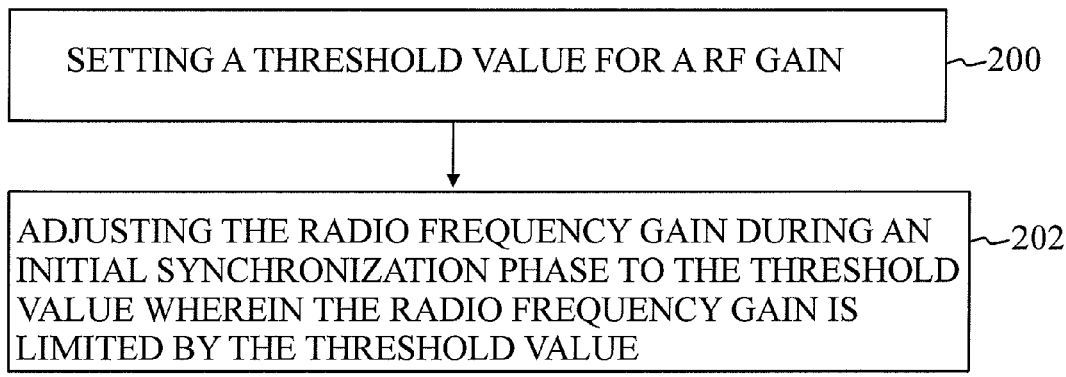
FIG. 2 shows a block diagram of an example of a method according to one embodiment of the present invention.

FIG. 2 illustrates a block diagram of an example of a method according to one embodiment of the present invention. For example, in a Time Division Duplex (TDD), network uplink (UL) and downlink (DL) transmissions are done in the same frequency channel, and uplink and downlink transmissions are separated in time. When user equipment (UE) is synchronized to a cell in a TDD network, it will only open its downlink receiver for reception in the time periods allocated for downlink transmissions.

A receiver in the user equipment comprises an Automatic Gain Control (AGC) which adjusts radio frequency gain to be suitable for receiving signals in uplink and downlink transmissions. When the user equipment starts the initial synchronization phase, the AGC may have been seriously misadjusted during the uplink region. This means for example that the radio frequency gain might have been set very low to adapt to a strong uplink. During the downlink transmission, the AGC has to adapt to the signal strength which may be very different. In the worst case, the AGC may not be able to set the radio frequency gain to a proper value.

A threshold value for the radio frequency gain is set in step 200. The radio frequency gain is adjusted during an initial synchronization phase where user equipment is first trying to receive synchronization signals in a transmission from a base station wherein the radio frequency gain is limited by the threshold value, step 202. The radio frequency gain is limited to the threshold value even if the signal power measurement performed by the AGC calls for an optimum radio frequency gain which is outside the limited threshold value. In one embodiment, setting the threshold value comprises setting an upper threshold value and a lower threshold value for the radio frequency gain. In the case of the upper threshold value for the radio frequency gain, limiting means that even if a higher radio frequency gain was required in a normal situation, the value of the radio frequency gain is limited to the upper threshold value (which is lower than the required higher radio frequency gain) during the initial synchronization phase. In the case of the lower threshold value for the radio frequency gain, limiting means that even if a lower radio frequency gain was required in a normal situation, the value of the radio frequency gain is limited to the lower threshold value (which is higher than the required lower radio frequency gain) during the initial synchronization phase. In other embodiments it is possible to set only one of the upper threshold value and the lower threshold value.

Figure 3:
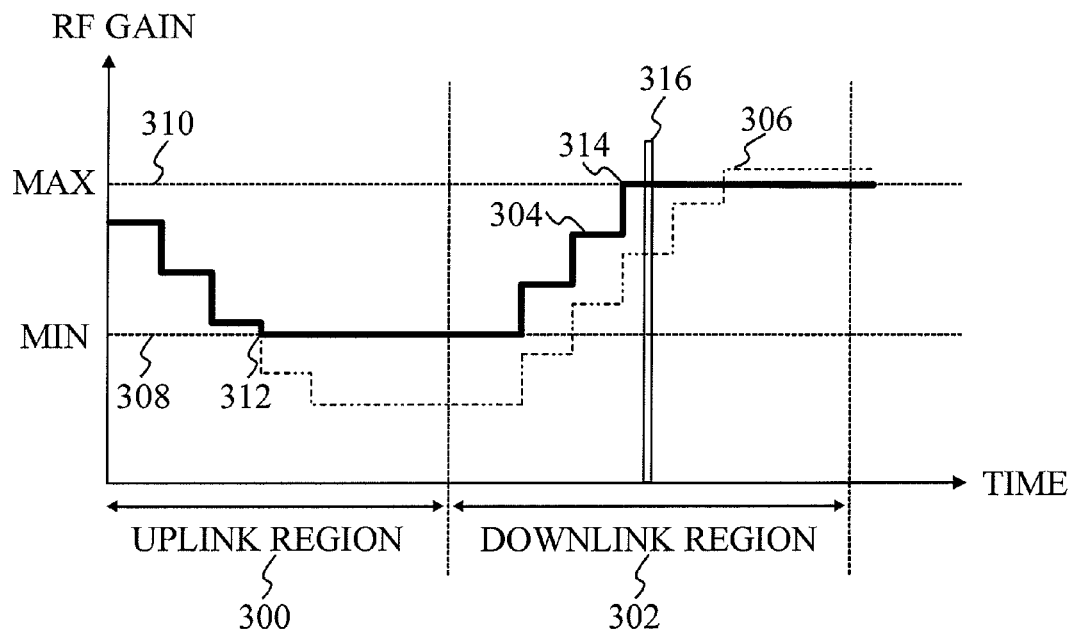
FIG. 3 shows an example of limiting the radio frequency gain according to one embodiment of the invention.

FIG. 3 illustrates an example of limiting a radio frequency gain by at least a lower threshold value (minimum gain 308) and optionally also an upper threshold value (maximum gain 310) according to one embodiment of the invention. FIG. 3 shows a simplified example of a situation where the radio frequency gain is misadjusted during an uplink transmission 300. In the arrangement of FIG. 3, a close-by user equipment is already synchronized to a Time Division Duplex (TDD) network. This interfering user equipment might be constantly transmitting with high power while the present user equipment is trying to get synchronized to the network. The unsynchronized user equipment will potentially receive the very strong uplink signal just before the downlink 302 synchronization signals are transmitted from an eNodeB.

A solid line 304 depicts a sequence of radio frequency gain values when the thresholds 308 and 310 are applied. A dashed line 306 depicts a sequence of radio frequency gains without applying the thresholds 308 and 310.

During the uplink region 300, an Automatic Gain Control (AGC) in the unsynchronized user equipment adjusts the radio frequency gain due to the strong signal from the interfering user equipment. When the radio frequency gain reaches point 312, it has reached the minimum gain limit (i.e. the lower threshold value). Due to the minimum gain limit, the AGC does not iterate the radio frequency gain any further (i.e. to a lower value) even though signal power measurements performed by the AGC requires an optimum radio frequency a gain that is lower than the minimum gain limit 308. As can be seen from FIG. 3, without applying the lower threshold value, the AGC would apply still lower gain values.

When the downlink region 302 starts, the AGC will iterate the gain value to higher values since the user equipment is receiving only a weak downlink signal. In other words, since the signal from the eNodeB is weaker now, the AGC has to adapt to the weaker signal by increasing the radio frequency gain. It may be noted that since the number of increasing (i.e. iteration) steps that the AGC is able to make is limited and the gain steps have a limited maximum size, the AGC may not be able to step up the radio frequency gain to a desired or optimum value. The maximum gain value reached is, however, adequate for detecting the P-SCH symbol 316. The AGC uses for example a Received Signal Strength Indicator (RSSI) to determine the radio frequency gain to use in the next iteration.

In the example shown in FIG. 3, the AGC reaches the maximum gain limit 310 at a point 314 before P-SCH symbol 316 is received, the P-SCH symbol being the Primary Synchronisation Channel symbol. This also means that it is possible to properly detect the P-SCH symbol 316 since the radio frequency gain value is high enough. If the lower threshold value 308 were not used, the required radio frequency gain level for detecting the P-SCH symbol 316 would be reached too late for detecting the symbol because the AGC would be starting from too low a level of RF gain.

In other words, the AGC limits the used radio frequency gain to be between the upper threshold value 310 and the lower threshold value 308 during the initial synchronization phase. The usage of the thresholds 308 and 310, and in this case particularly the lower threshold 308, makes it possible for the AGC to iterate faster towards a high radio frequency gain when the desired synchronization signal is very weak and the AGC was misadjusted because of uplink interference caused by close-by user equipment. This also improves the likelihood of a successful synchronization attempt.

In one embodiment of the example shown in FIG. 3, the lower threshold value 308 is set to the highest gain such that the maximum level of the synchronization signal can be detected without significant degradation in detection performance. In one embodiment, the upper threshold value 310 is set to the lowest gain such that the minimum level of the synchronization signal can be detected without significant degradation in detection performance.

Figure 4:
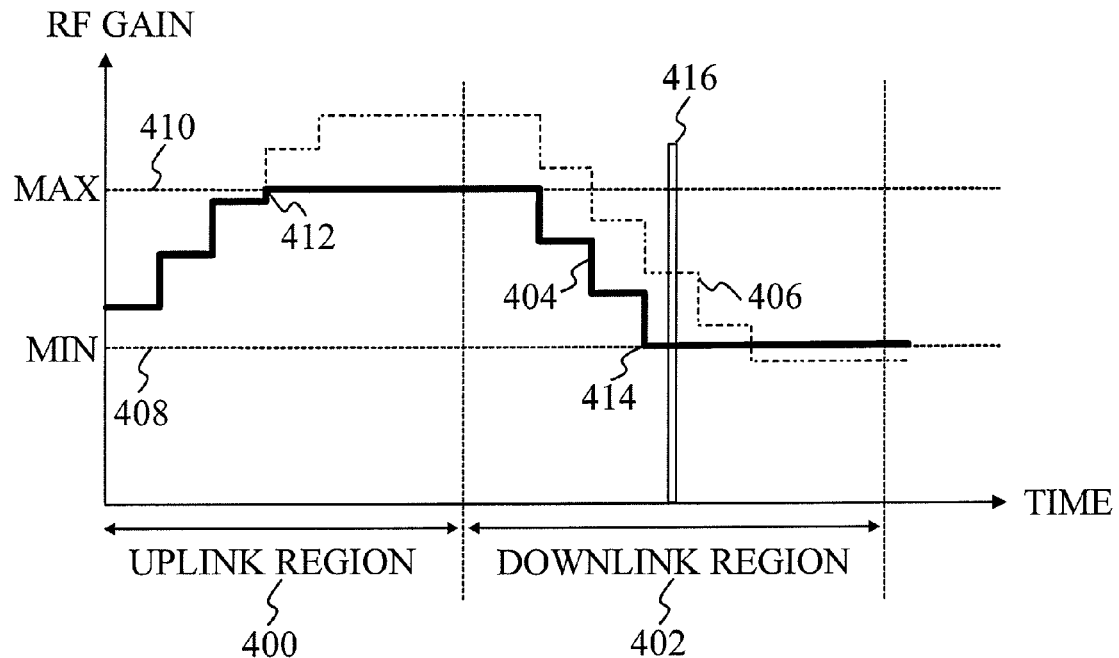
FIG. 4 shows an example of limiting the radio frequency gain according to another embodiment of the invention.

FIG. 4 illustrates an example of limiting a radio frequency gain by at least an upper threshold value (maximum gain 410) and optionally also a lower threshold value (minimum gain 408) according to another embodiment of the invention. FIG. 4 shows a simplified example of a situation where the radio frequency gain is misadjusted during an uplink transmission in a Time Division Duplex (TDD) network. In the arrangement of FIG. 4, there are no uplink allocations in the TDD uplink region 400 and the user equipment that needs to synchronize to a cell is very close to an eNodeB. Because there are no uplink allocations, the user equipment could be receiving a very weak signal in the uplink region 400. The received signal level can be as low as the thermal noise floor.

In the downlink region 402, if the radio frequency gain value is the same as the last radio frequency gain value during the uplink transmission, an Automatic Gain Control (AGC) of the user equipment will face the challenge of settling to an appropriate low radio frequency gain level for reception of the synchronization channel shortly after having settled to a very high radio frequency gain level in the uplink region 400.

The problem is solved by defining an upper threshold value 410 (and optionally a lower threshold value 408) for the radio frequency gain used during the initial synchronization phase even though the signal power measurements performed by the AGC requires an optimum radio frequency gain that is outside the threshold values. Because the user equipment is very close to the eNodeB, the synchronization channel may be received as a very strong signal, for example −25 dBm. Using the upper threshold value 410 makes it possible for the AGC to iterate faster towards a low radio frequency gain when the desired synchronization signal is very strong and the AGC was misadjusted because of no signal in the uplink region 400. This also improves the likelihood of successful synchronization attempt.

A solid line 404 depicts a sequence of radio frequency gain values when the thresholds 408 and 410 are applied. A dashed line 406 depicts a sequence of radio frequency gains without applying the thresholds 408 and 410.

During the uplink region 400, the AGC in the unsynchronized user equipment adjusts the radio frequency gain due to a weak received signal. When the radio frequency gain reaches point 412, it has reached the maximum gain limit (i.e. the upper threshold value). Due to the maximum gain limit, the AGC does not iterate the radio frequency gain any further (i.e. to a higher value) even though signal power measurements performed by the AGC require an optimum radio frequency gain that is higher than the minimum gain limit 408. As can be seen from FIG. 4, without applying the upper threshold value 310, the AGC would apply still higher gain values.

When the downlink region 402 starts, the AGC will iterate the gain value to lower values since the user equipment is now receiving a strong downlink signal. In other words, since the signal from the eNodeB is very strong now, the AGC has to adapt to the signal by decreasing the radio frequency gain. However, since the number of decreasing (i.e. iteration) steps that the AGC is able to make is limited and the gain steps have a limited maximum size, the AGC may not be able to step down the radio frequency gain to a desired or optimum value. The reached minimum gain value is, however, adequate for detecting the P-SCH symbol 416.

The AGC uses for example a Received Signal Strength Indicator (RSSI) to determine the radio frequency gain to use in the next iteration.

In the example shown in FIG. 4, the AGC reaches the minimum gain limit 408 at a point 414 before P-SCH symbol 416 is received. This also means that it is possible to properly detect the P-SCH symbol 416 since the radio frequency gain value is low enough. If the upper threshold value were not used, the required radio frequency gain level for detecting the P-SCH symbol 416 would be reached too late for properly detecting the symbol because the AGC would be starting from too high a level of RF gain.

In other words, the AGC limits the used radio frequency gain to be between the upper threshold value 410 and the lower threshold value 408 during the initial synchronization phase. The usage of the thresholds 408 and 410, and in this case particularly the upper threshold 410, makes it possible for the AGC to iterate faster towards a low radio frequency gain when the desired synchronization signal is very weak and the AGC was misadjusted. This also improves the likelihood of successful synchronization attempt.

In one embodiment of FIG. 4, the lower threshold value 408 is set to the highest gain such that the maximum level of the synchronization signal can be detected without significant degradation in detection performance. In one embodiment, the upper threshold value 410 is set to the lowest gain such that the minimum level of the synchronization signal can be detected without significant degradation in detection performance.

Figure 5:
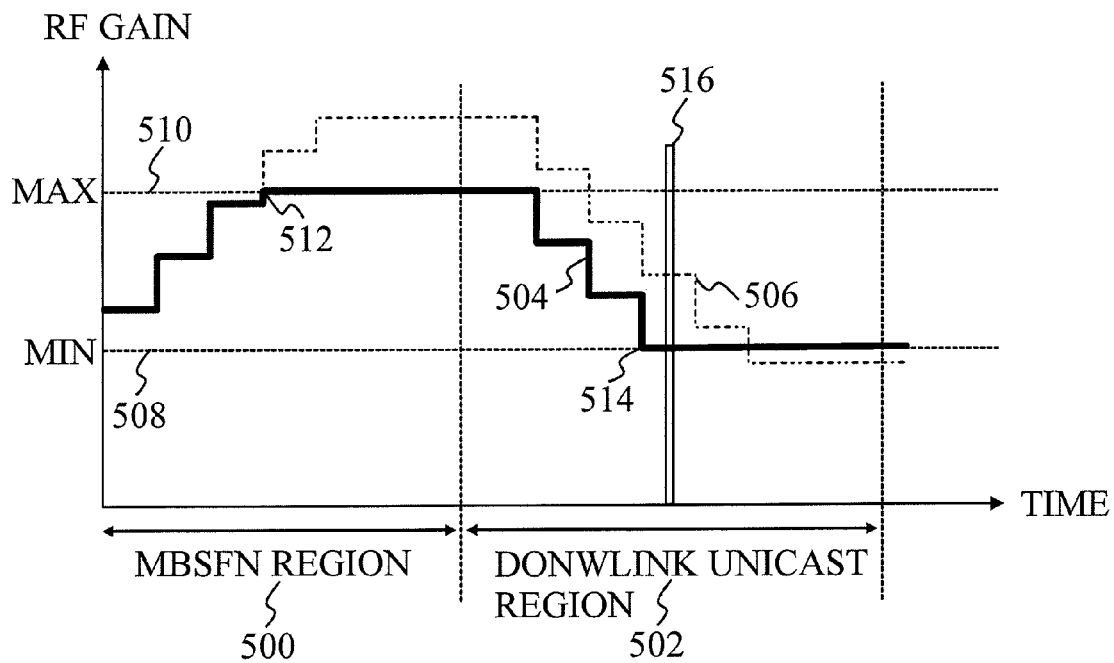
FIG. 5 shows an example of limiting the radio frequency gain according to another embodiment of the invention.

FIG. 5 shows an example of limiting the radio frequency gain by at least an upper threshold value 508 and optionally also a lower threshold value 510 according to another embodiment of the invention.

During the initial synchronization phase in a Long Term Evolution (LTE) Frequency Division Duplex (FDD) system featuring an MBMS Single Frequency Network (MBSFN), power measurements are unsynchronized to the network's frame structure. Therefore, a power measurement may be done during an empty MBSFN region and the measurement may indicate a very low power. FIG. 5 shows a scenario for the FDD comprising an MBSFN region 500. A unicast region 502 is a normal unicast downlink subframe or a set of subframes. All symbols but the first symbol in a subframe in the MBSFN region 500 may be empty, i.e. no power is transmitted there. Thus, an Automatic Gain Control (AGC) settles to a very high radio frequency gain value during the MBSFN region 500.

In a normal situation (i.e. without using the upper threshold 510) when the downlink unicast region 502 starts and if the wanted downlink signal is very strong (e.g. −25 dBm) and the AGC control has settled to a very high value because there is no signal received in the MBSFN region, the radio frequency gain would normally have to change from the very high value to a very low value during a few AGC iterations.

A solid line 504 depicts a sequence of radio frequency gain values when the thresholds 508 and 510 are applied. A dashed line 506 depicts a sequence of radio frequency gains without applying the thresholds 508 and 510.

During the MBSFN region 500, the AGC in the unsynchronized user equipment adjusts the radio frequency gain due to a weak received signal. When the radio frequency gain reaches point 512, it has reached the maximum gain limit 510 (i.e. the upper threshold value). Due to the maximum gain limit 510, the AGC does not iterate the radio frequency gain any further (i.e. to a higher value) even though signal power measurements performed by the AGC require an optimum radio frequency gain that is higher than the minimum gain limit 510. As can be seen from FIG. 5, without applying the upper threshold 510, the AGC would apply still higher gain values.

When the downlink unicast region 502 starts, the AGC will iterate the gain value to lower values since the user equipment is now receiving a strong downlink signal. In other words, since the signal from the eNodeB is very strong now, the AGC has to adapt to the signal by decreasing the radio frequency gain. However, since the number of decreasing (i.e. iteration) steps that the AGC is able to make is limited and the gain steps have a limited maximum size, the AGC may not be able to step down the radio frequency gain to a desired or optimum value. The reached minimum gain value is, however, adequate for detecting the P-SCH symbol 516. The AGC uses for example a Received Signal Strength Indicator (RSSI) to determine the radio frequency gain to use in the next iteration.

In the example shown in FIG. 5, the AGC reaches the minimum gain limit 508 at a point 514 before P-SCH 516 symbol is received. This also means that it is possible to properly detect the P-SCH symbol 516 since the radio frequency gain value is low enough. If the upper threshold value were not used, the required radio frequency gain level for detecting the P-SCH symbol 516 is reached too late for properly detecting the symbol.

In one embodiment of FIG. 5, the lower threshold value 508 is set to the highest gain where the maximum level of the synchronization signal can be detected without significant degradation in detection performance. In one embodiment, the upper threshold value 510 is set to the lowest gain where the minimum level of the synchronization signal can be detected without significant degradation in detection performance.

Figure 6:
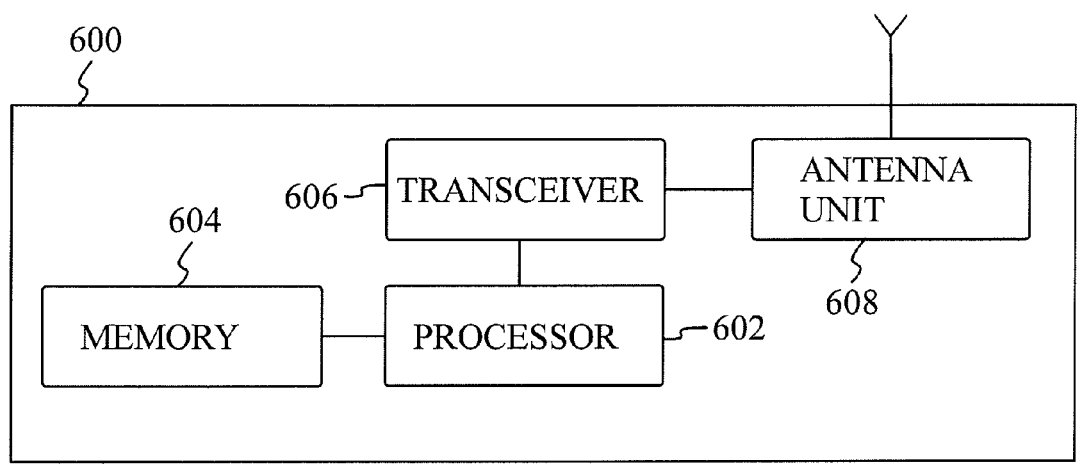
FIG. 6 shows a block diagram of an example of an apparatus according to one embodiment of the present invention.

Referring to FIG. 6, an example of an apparatus 600 according to an embodiment of the present invention includes a processor 602, a memory 604 coupled to the processor 602, and a suitable transceiver 606 (having a transmitter (TX) and a receiver (RX)) coupled to the processor 602 and an antenna unit 608.

The processor 602, or some other form of generic central processing unit (CPU) or special-purpose processor such as digital signal processor (DSP), may operate to control the various components of the apparatus 600 in accordance with embedded software or firmware stored in memory 604 or stored in memory contained within the processor 602 itself. In addition to the embedded software or firmware, the processor 602 may execute other applications or application modules stored in the memory 604 or made available via wireless network communications. The application software may comprise a compiled set of machine-readable instructions that configures the processor 602 to provide the desired functionality, or the application software may be high-level software instructions to be processed by an interpreter or compiler to indirectly configure the processor 602.

The transceiver 606 is for bidirectional wireless communications with another wireless device, e.g. an evolved NodeB. The transceiver 606 may provide e.g. frequency shifting, converting received RF signals to baseband and converting baseband transmit signals to RF. In some embodiments, the radio transceiver or RF transceiver may be understood to include other signal processing functionality such as modulation/demodulation, coding/decoding, and other signal processing functions. In some embodiments, the transceiver 606, portions of the antenna unit 608 and an analog baseband processing unit may be combined in one or more processing units and/or application specific integrated circuits (ASICs).

The antenna unit 608 may be provided to convert between wireless signals and electrical signals, enabling the apparatus 600 to send and receive information from a cellular network or some other available wireless communications network or from a peer wireless device. The antenna unit 608 may include antenna tuning and/or impedance matching components, RF power amplifiers, and/or low noise amplifiers.

In one embodiment, the apparatus 600 is for example user equipment (UE) of a Long Term Evolution (LTE) Time Division Duplex (TDD) network.

Figure 7:
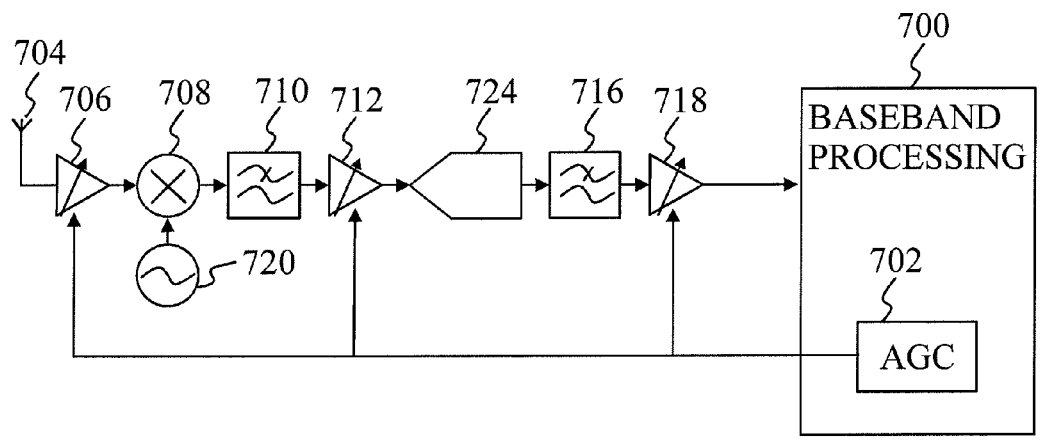
FIG. 7 shows a block diagram of an example of a receiver according to one embodiment of the invention.

FIG. 7 shows a schematic block diagram of an example of a receiver according to one embodiment of the invention. The receiver comprises an input from an antenna 704. The antenna 704 is connected to an amplifier (LNA) 707. The output of the LNA 708 goes to a mixer 708. The mixer 708 is also connected to a local oscillator 720. The output of the mixer 708 goes to an analog channel filter 710. The output of the analog channel filter 710 is amplified by an amplifier 712. The output from the low-noise amplifier is input to an analog-to-digital converter (ADC) 724. The output from the ADC 704 is input to a digital channel filter 716. The output from the digital channel filter 716 is input to a digital gain stage 718. Finally, the output from the digital gain stage 718 is connected to a baseband processing unit 700. The baseband processing unit 700 comprises also an automatic gain control (AGC) 702, which is connected to the amplifiers 707, 712 and the digital gain stage 718.

In one embodiment, the term "radio frequency gain" used in this specification covers the combined gain from an antenna to the digital output of the radio frequency stage.

The radio frequency receiver used e.g. in the LTE will normally feature a wide range for the radio frequency gain setting for achieving optimum decoding performance in the modem for a wide range of received signal levels. This wide adjustment range for the radio frequency gain is beneficial because a non-optimum gain setting might influence decoding performance when higher order modulation is used in the DL transmission. Receiving and detecting the synchronization signals (SCH) is however fairly uncritical in regard to optimum radio frequency gain setting. This is because the SCH modulation is robust Quadrature Phase Shift Keying (QPSK) modulation. For SCH detection, some gain deviation compared to the optimum gain for the received signal level can be tolerated without sacrificing synchronization performance.

In the above, the examples have been described using a Long Term Evolution (LTE) TDD and FDD network including user equipment and eNodeB. However, any other technology which includes a wireless interface between an apparatus and a base station can be used as long as the apparatus as long as uplink and downlink transmissions are separated in time.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

For example, the invention may be implemented with an Automatic Gain Control (AGC) of user equipment as a software implementation. In another embodiment, the invention is implemented with a combination of software and hardware or with hardware only.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method for operating a user equipment, the method comprising:
    setting an upper gain threshold value and a lower gain threshold value for gain control; and
    prior to detection of at least one synchronization signal in a received signal, performing iterative automatic gain control (AGC) on the received signal while limiting a radio frequency gain applied to the received signal so as not to apply a radio frequency gain greater than the upper gain threshold value or lower than the lower gain threshold value, wherein
    in each iteration of the iterative AGC,
        the radio frequency gain is increased in response to a determination that a received signal strength of the user equipment is below a threshold and that the increased radio frequency gain is not above the upper gain threshold value, or
        the radio frequency gain is decreased in response to a determination that the received signal strength of the user equipment is above a threshold and that the decreased radio frequency gain is not below the lower gain threshold value.

2. The method according to claim 1, wherein the user equipment executes the method while operating in a time division duplex (TDD) mode of Long Term Evolution (LTE) radio access technology.

3. The method according to claim 1, wherein the user equipment executes the method while operating in a frequency division duplex (FDD) mode of Long Term Evolution (LTE) radio access technology.

4. The method according to claim 1, wherein the radio frequency gain applied to the received signal prior to detection of the at least one synchronization signal is from an iterative automatic gain control (AGC) adjustment arising from signal power measurements of only uplink signaling.

5. The method according to claim 4, wherein the at least one synchronization signal that is detected in the received signal is a primary synchronization channel (P-SCH) symbol.

6. The method according to claim 5, wherein the iterative AGC adjustment adjusts the radio frequency gain to reach one of the upper gain threshold value or the lower gain threshold value prior to when the P-SCH symbol is detected in the received signal.

7. The method according to claim 5, wherein the iterative AGC adjustment adjusts the radio frequency gain in each iteration by a fixed maximum gain, and all iterative AGC adjustments for detecting the P-SCH symbol in the received signal are completed prior to when the P-SCH symbol is received.

8. An apparatus comprising:
circuitry configured to
set an upper gain threshold value and a lower gain threshold value for gain control; and
prior to detection of at least one synchronization signal in a received signal, perform iterative automatic gain control (AGC) on the received signal while limiting a radio frequency gain applied to the received signal so as not to apply a radio frequency gain greater than the upper gain threshold value or lower than the lower gain threshold value wherein
in each iteration of the iterative AGC,
the radio frequency gain is increased in response to a determination that a received signal strength of the user equipment is below a threshold and that the increased radio frequency gain is not above the upper gain threshold value, or
the radio frequency gain is decreased in response to a determination that the received signal strength of the user equipment is above a threshold and that the decreased radio frequency gain is not below the lower gain threshold value.

9. The apparatus according to claim 8, wherein the circuitry is operating as user equipment in a time division duplex (TDD) mode of Long Term Evolution (LTE) radio access technology.

10. The apparatus according to claim 8, wherein the circuitry is operating as user equipment in a frequency division duplex (FDD) mode of Long Term Evolution (LTE) radio access technology.

11. The apparatus according to claim 8, wherein the radio frequency gain applied to the received signal prior to detection of the at least one synchronization signal is from an iterative automatic gain control (AGC) adjustment arising from signal power measurements of only uplink signaling.

12. The apparatus according to claim 11, wherein the at least one synchronization signal that is detected in the received signal is a primary synchronization channel (P-SCH) symbol.

13. The apparatus according to claim 12, wherein the iterative AGC adjustment adjusts the radio frequency gain to reach one of the upper gain threshold value or the lower gain threshold value prior to when the P-SCH symbol is detected in the received signal.

14. The apparatus according to claim 12, wherein the iterative AGC adjustment adjusts the radio frequency gain in each iteration by a fixed maximum gain, and all iterative AGC adjustments for detecting the P-SCH symbol in the received signal are completed prior to when the P-SCH symbol is received.

15. A non-transitory computer-readable memory storing a computer program bearing computer program code that causes a computer to perform a method, the method comprising:
setting an upper gain threshold value and a lower gain threshold value for gain control; and
prior to detection of at least one synchronization signal in a received signal, performing iterative automatic gain control (AGC) on the received signal while limiting a radio frequency gain applied to the received signal so as not to apply a radio frequency gain greater than the upper gain threshold value or lower than the lower gain threshold value, wherein
in each iteration of the iterative AGC,
the radio frequency gain is increased in response to a determination that a received signal strength of the user equipment is below a threshold and that the increased radio frequency gain is not above the upper gain threshold value, or
the radio frequency gain is decreased in response to a determination that the received signal strength of the user equipment is above a threshold and that the decreased radio frequency gain is not below the lower gain threshold value.

16. The non-transitory computer-readable memory according to claim 15, wherein computer is disposed in a user equipment and the computer program code is executed while the user equipment is operating in at least one of a time division duplex (TDD) mode and a frequency division duplex (FDD) mode of Long Term Evolution (LTE) radio access technology.

17. The non-transitory computer-readable memory according to claim 15, wherein the radio frequency gain applied to the received signal prior to detection of the at least one synchronization signal is from an iterative automatic gain control (AGC) adjustment arising from signal power measurements of only uplink signaling.

18. The non-transitory computer-readable memory according to claim 17, wherein the at least one synchronization signal that is detected in the received signal is a primary synchronization channel (P-SCH) symbol.

19. The non-transitory computer-readable memory according to claim 18, wherein the iterative AGC adjustment adjusts the radio frequency gain to reach one of the upper gain threshold value or the lower gain threshold value prior to when the P-SCH symbol is detected in the received signal.

20. The non-transitory computer-readable memory according to claim 18, wherein the iterative AGC adjustment adjusts the radio frequency gain in each iteration by a fixed maximum gain, and all iterative AGC adjustments for detecting the P-SCH symbol in the received signal are completed prior to when the P-SCH symbol is received.

* * * * *